(12) United States Patent
Seto et al.

(10) Patent No.: US 8,875,352 B2
(45) Date of Patent: Nov. 4, 2014

(54) BRAKING STRUCTURE FOR HANDLE BODY

(75) Inventors: Masatora Seto, Yokohama (JP); Keiji Yamaguchi, Yokohama (JP); Shuichi Yuda, Yamato (JP)

(73) Assignee: Nifco Inc., Yokohama-Shi (JP)

( * ) Notice: Subject to any disclaimer, the term of this patent is extended or adjusted under 35 U.S.C. 154(b) by 190 days.

(21) Appl. No.: 13/510,474

(22) PCT Filed: Nov. 12, 2010

(86) PCT No.: PCT/JP2010/070228
§ 371 (c)(1),
(2), (4) Date: Jun. 29, 2012

(87) PCT Pub. No.: WO2011/062122
PCT Pub. Date: May 26, 2011

(65) Prior Publication Data
US 2012/0273310 A1 Nov. 1, 2012

(30) Foreign Application Priority Data
Nov. 18, 2009 (JP) ................................ 2009-263188

(51) Int. Cl.
*A45C 13/22* (2006.01)
*F16F 9/12* (2006.01)
*B60N 3/02* (2006.01)

(52) U.S. Cl.
CPC . *B06N 3/023* (2013.01); *F16F 9/12* (2013.01); *B60N 3/026* (2013.01)
USPC .............................................. 16/444; 16/438

(58) Field of Classification Search
USPC ................ 16/110.1, 412, 429, 438, 444, 445; 188/290, 293, 294, 296; 296/1.02
See application file for complete search history.

(56) References Cited

U.S. PATENT DOCUMENTS 6,223,395 B1 * 5/2001 Miho et al. ...................... 16/429
6,467,130 B2 * 10/2002 Kurachi et al. .................. 16/438
(Continued)

FOREIGN PATENT DOCUMENTS

| CN | 1502832 A | 6/2004 |
|---|---|---|
| CN | 1580604 A | 2/2005 |
| JP | H07-238971 A | 9/1995 |
| JP | 2004-359201 A | 12/2004 |

OTHER PUBLICATIONS

China Patent Office, "Office Action for CN 201080052024.1," Dec. 3, 2013.

*Primary Examiner* — Christopher Schwartz
(74) *Attorney, Agent, or Firm* — Manabu Kanesaka

(57) ABSTRACT

A braking structure for a turning body includes an engagement device rotatably engaging a movable-side portion of a rotation damper with a base at a rotation center of the movable-side portion; a first fixing device fixing the movable-side portion relative to the turning body; and a second fixing device fixing a stationary-side portion of the rotation damper relative to the base. The engagement device includes an axis protrusion provided on one side of either the movable-side portion or the base, and a receiving portion provided on the other side of either the movable-side portion or the base, and receiving the axis protrusion from a direction perpendicular to a rotation axis of the rotation. Also, an inserting path for the axis protrusion continuing to the receiving portion is adapted to expand in the direction perpendicular to the rotation axis by an elastic deformation when the inserting path receives the axis protrusion.

6 Claims, 9 Drawing Sheets

(56) References Cited

U.S. PATENT DOCUMENTS

| | | | |
|---|---|---|---|
| 6,511,036 B1 * | 1/2003 | Hansen | 248/596 |
| 6,604,614 B2 * | 8/2003 | Kurihara et al. | 188/290 |
| 6,708,371 B2 * | 3/2004 | Belchine, III | 16/386 |
| 6,913,125 B2 | 7/2005 | Hayashi | |
| 7,103,939 B2 * | 9/2006 | Belchine et al. | 16/412 |
| 8,245,357 B2 * | 8/2012 | Kajio et al. | 16/444 |
| 2005/0034269 A1 | 2/2005 | Jinbo | |
| 2005/0091798 A1 | 5/2005 | Belchine, III et al. | |
| 2011/0214255 A1 * | 9/2011 | Kajio et al. | 16/429 |
| 2012/0304418 A1 * | 12/2012 | Kajio et al. | 16/110.1 |
| 2013/0019437 A1 * | 1/2013 | Takai et al. | 16/429 |

* cited by examiner

BRAKING STRUCTURE FOR HANDLE BODY

FIELD OF TECHNOLOGY

The present invention relates to an improvement of a braking structure which is applied to a combined portion between the after-mentioned kind of turning body and a base so as to provide a predetermined braking force to the turning according to the turning body combined turnably relative to the base.

BACKGROUND ART

In order to fix an internal-portion rotation body of a damper comprising the internal-portion rotation body and an external-portion rotation body to an attachment-support member turnably supporting a handle, there is a structure provided with a boss on one of both end portions of the internal-portion rotation body, and a rib on the other of both-end portions of the internal-portion rotation body. (See Patent Document 1) The external-portion rotation body is fixed to the handle. The damper is fitted between a pair of legs of the support member. In one of a pair of legs, there is formed a slot relative to the aforementioned rib, and in the other of a pair of legs, there is formed an attachment hole relative to the aforementioned boss. The internal-portion rotation body of the damper is adapted to be fixed to the support member on a side of the rib by sliding and inserting the rib into the slot, and to be supported in the support member on a side of the boss by fitting the boss into the attachment hole. Hence, in a method of the Patent Document 1, when the damper is embedded, there is no choice but to fit the boss into the attachment hole by elastically deforming a pair of leg sides, so that it is difficult to smoothly fit the damper between a pair of legs.

PRIOR ART DOCUMENT

Patent Document

Patent Document 1: Japanese Patent Publication No. 2005-138823

SUMMARY OF THE INVENTION

Problems To Be Solved By the Invention

The main problem to be solved by the present invention is to easily and adequately embed a rotation damper on the combined portion between the turning body and the base in this kind of braking structure.

Means For Solving the Problems

In order to achieve the aforementioned problem, in the present invention, from the first aspect, a braking structure for a turning body is turnably combined relative to a base, and comprises a rotation damper including a stationary-side portion and a movable-side portion, and structured in such a way that a braking force acts on a rotation of the movable-side portion; an engagement device rotatably engaging the movable-side portion of the rotation damper with the base at a rotation center thereof; a first fixing device fixing the movable-side portion relative to the turning body; and a second fixing device fixing the stationary-side portion of the rotation damper relative to the base. The engagement device includes an axis protrusion provided on one side of either the movable-side portion or the base, and a receiving portion provided on the other side of either the movable-side portion or the base, and receiving the axis protrusion from a direction perpendicular to a rotation axis of the rotation. Also, an inserting path for the axis protrusion, continuing to the receiving portion, is adapted to expand by an elastic deformation in the direction perpendicular to the rotation axis when receiving the axis protrusion.

It is preferable that such inserting path is formed between a pair of elastic engaging pieces.

When the rotation damper is embedded on the base, the axis protrusion reaches the receiving portion while elastically deforming the inserting path, and due to an elastic return at a position thereof, the axis protrusion is stably held in the receiving portion. Thereby, the movable-side portion of the rotation damper can be rotatably combined smoothly relative to the base, and can be supported.

In order to achieve the aforementioned problem, in the present invention, from a second aspect, the braking structure for the turning body is turnably combined relative to a base, and comprises a rotation damper including a stationary-side portion and a movable-side portion, and structured in such a way that the braking force acts on the rotation of the movable-side portion; an engagement device rotatably engaging the movable-side portion of the rotation damper with the base at the rotation center thereof; a first fixing device fixing the movable-side portion relative to the turning body; and a second fixing device fixing the stationary-side portion of the rotation damper relative to the base. The engagement device includes an axis protrusion provided on one side of either the movable-side portion or the base, and a receiving portion provided on the other side of either the movable-side portion or the base, and receiving the axis protrusion from a direction along the rotation axis of the rotation. Also, one side of either an axis protrusion side or a receiving portion side is adapted to move by the elastic deformation in the direction along the rotation axis when the receiving portion receives the axis protrusion.

When the rotation damper is embedded on the base, due to the elastic deformation in the direction along the rotation axis, the axis protrusion reaches the receiving portion. When the axis protrusion reaches the receiving portion, the elastic return is allowable, so that the axis protrusion is stably held in the receiving portion. Thereby, the movable-side portion of the rotation damper can be rotatably combined smoothly relative to the base, and can be supported.

In order to achieve the aforementioned problem, in the present invention, from a third aspect, the braking structure for the turning body is turnably combined relative to a base, and comprises a rotation damper including a stationary-side portion and a movable-side portion, and structured in such a way that the braking force acts on the rotation of the movable-side portion; an engagement device rotatably engaging the movable-side portion of the rotation damper with the base at the rotation center thereof; a first fixing device fixing the movable-side portion relative to the turning body; and a second fixing device fixing the stationary-side portion of the rotation damper relative to the base. The engagement device includes an axis protrusion provided on one side of either the movable-side portion or the base, and a receiving portion provided on the other side of either the movable-side portion or the base, and receiving the axis protrusion from the direction along the rotation axis of the rotation. Also, one side of either the axis protrusion side or the receiving portion side is adapted to move in the direction along the rotation axis against urging of an urging device when the receiving portion receives the axis protrusion.

When the rotation damper is embedded on the base, due to the movement against the urging of the urging device, the axis protrusion reaches the receiving portion. When the axis protrusion reaches the receiving portion, due to the urging, the axis protrusion is stably held in the receiving portion. Thereby, the movable-side portion of the rotation damper can be rotatably combined smoothly relative to the base, and can be supported.

Effect of the Invention

According to the present invention, the rotation damper can be easily embedded on the combined portion between the turning body and the base, and also the braking force thereof can adequately act on the turning of such turning body.

BRIEF DESCRIPTION OF THE DRAWINGS

FIG. 17(b) shows a state wherein one portion of a stationary-side portion of the rotation damper is elastically deformed from a state of FIG. 17(a).

BEST MODES OF CARRYING OUT THE INVENTION

Figure 1:
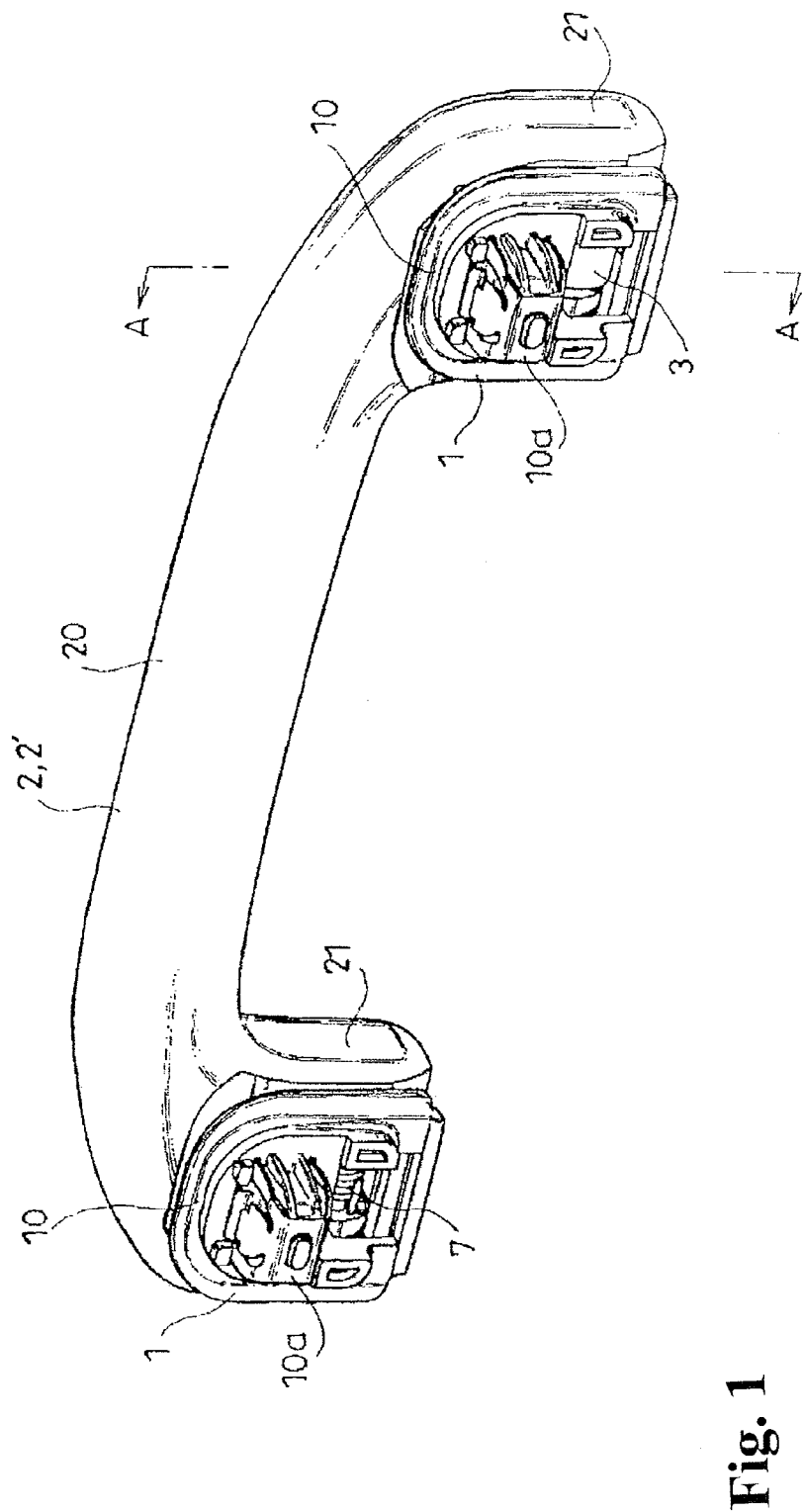
FIG. 1 is a perspective structural view of an assist grip device structured by applying a braking structure according to one embodiment of the present invention.
Figure 2:
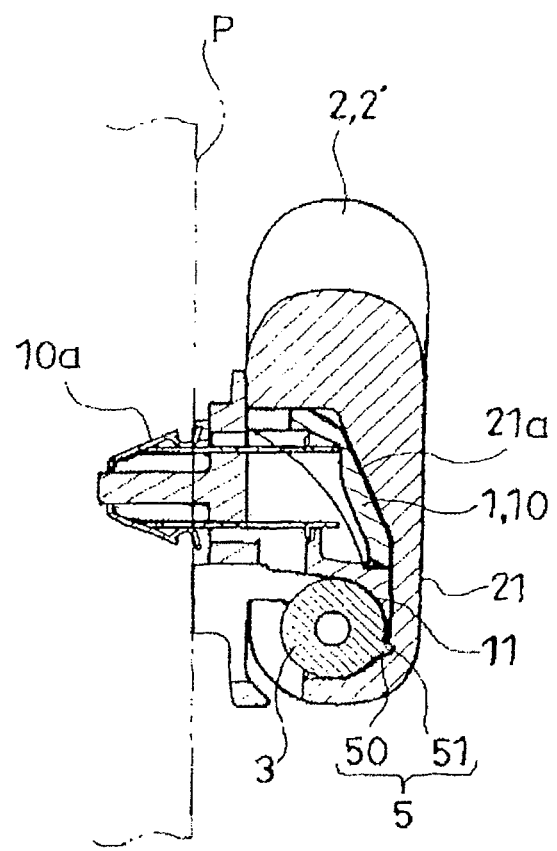
FIG. 2 is a cross-sectional structural view showing a usage state of the assist grip device shown in FIG. 1 and shown as a cross-sectional surface taken along the line A to A in FIG. 1.
Figure 3:
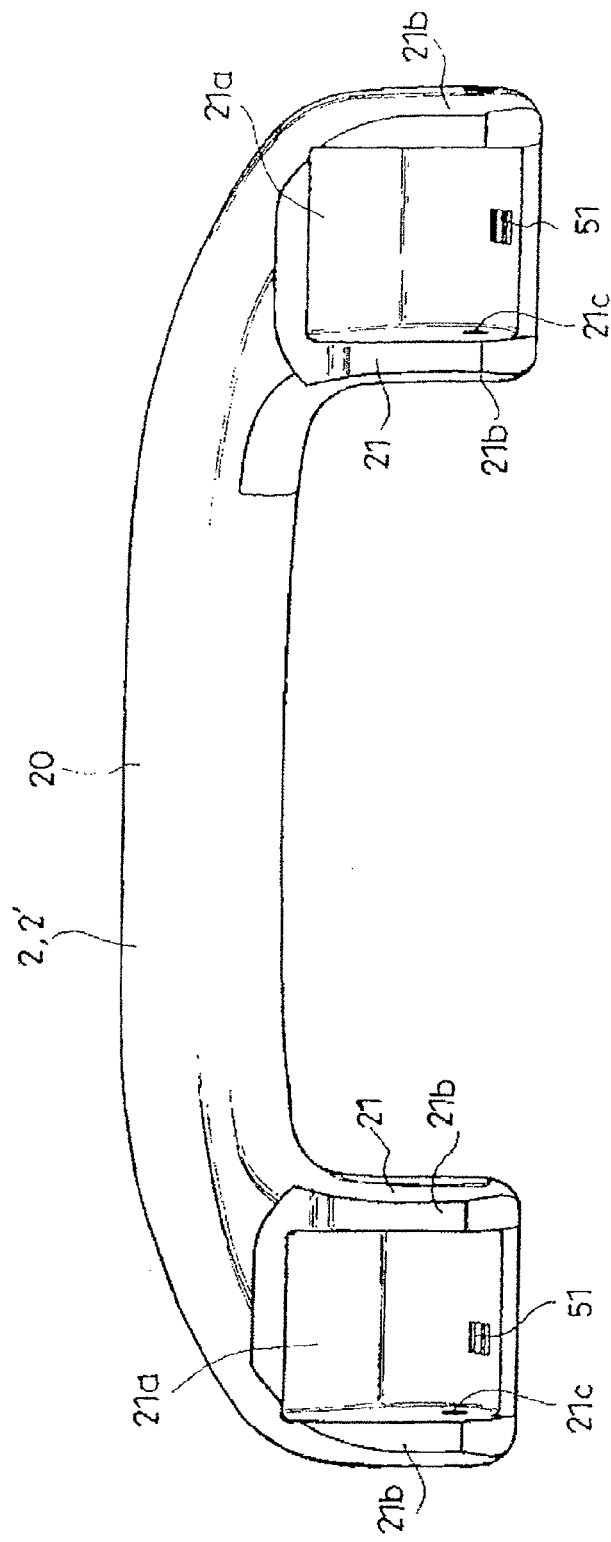
FIG. 3 is a perspective structural view of an assist grip.
Figure 4:
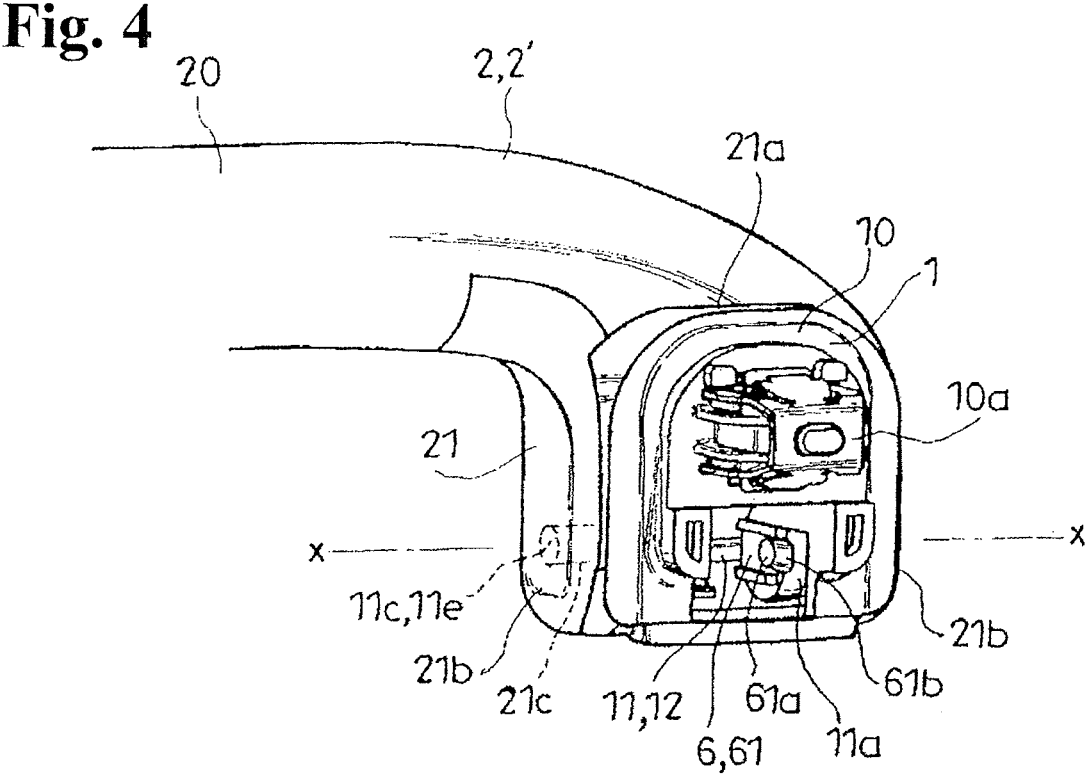
FIG. 4 is a perspective structural view of essential parts showing a state before a rotation damper is embedded on a base combined with the assist grip.
Figure 5:
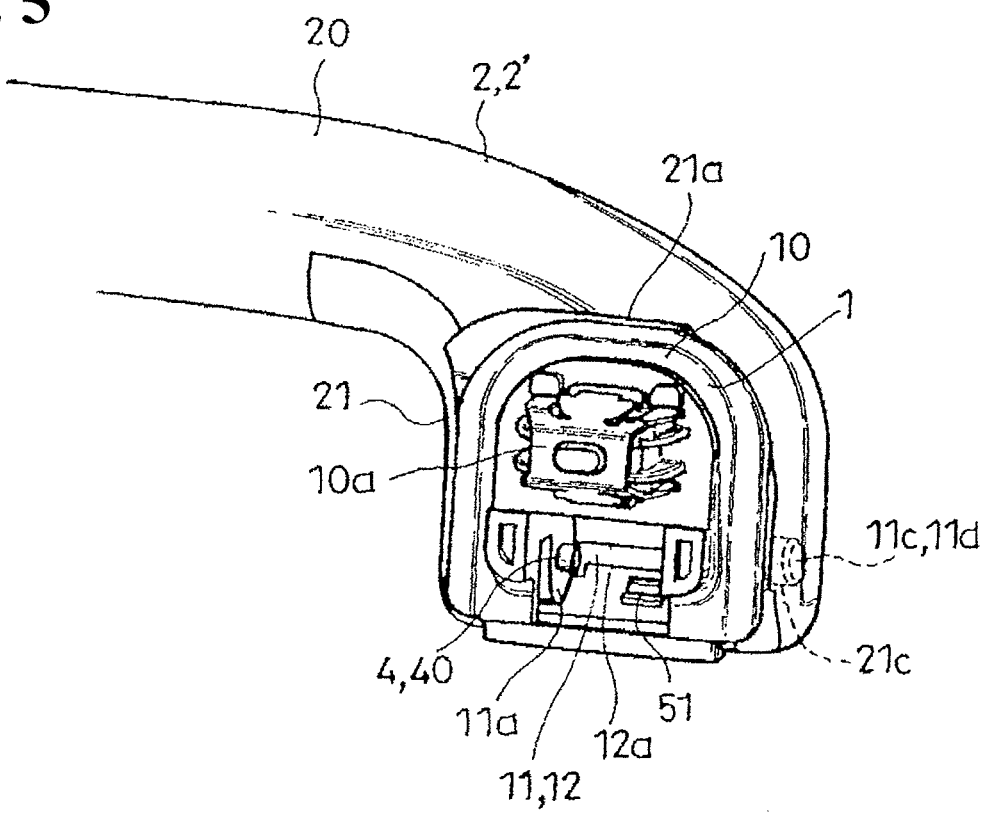
FIG. 5 is a perspective structural view of the essential parts showing the state before the rotation damper is embedded on the base combined with the assist grip.
Figure 6:
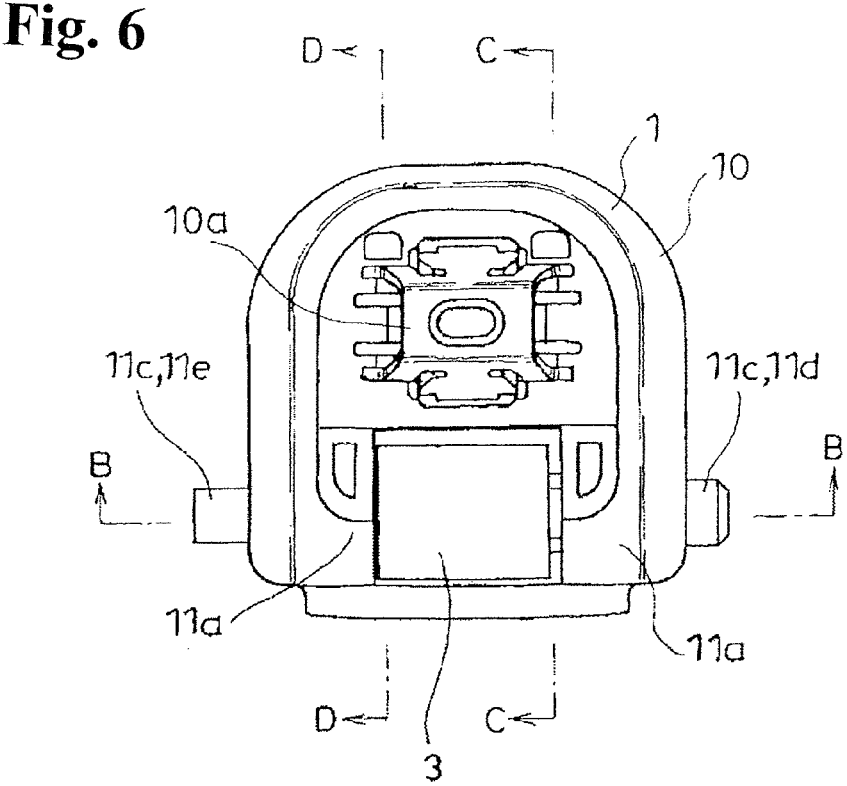
FIG. 6 is a front view of the base in which the rotation damper is embedded.
Figure 7:
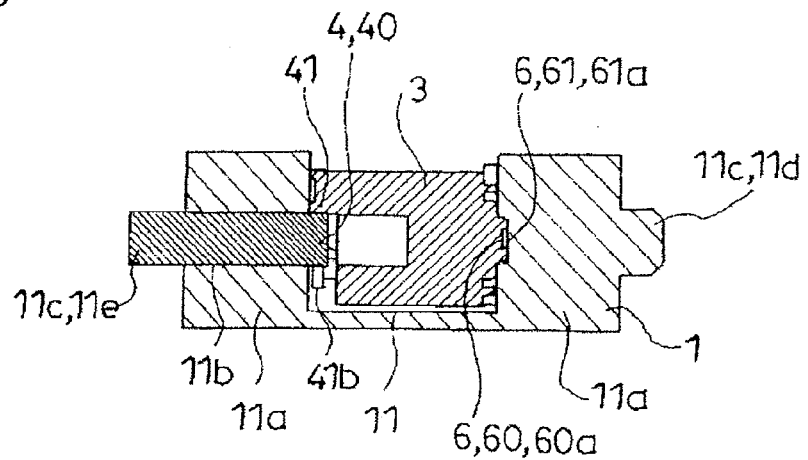
FIG. 7 is a cross-sectional structural view taken along a line B to B in FIG. 6, and an internal structure of the rotation damper is omitted.
Figure 8:
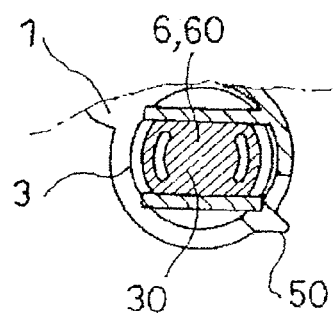
FIG. 8 is a cross-sectional structural view taken along the line C to C in FIG. 6.
Figure 9:
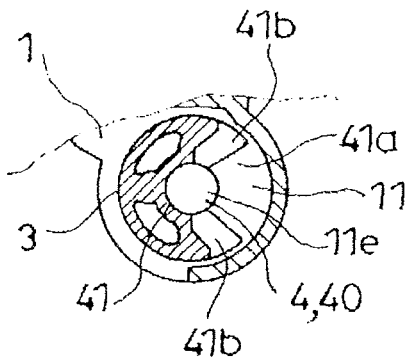
FIG. 9 is a cross-sectional structural view taken along the line D to D in FIG. 6.
Figure 10:
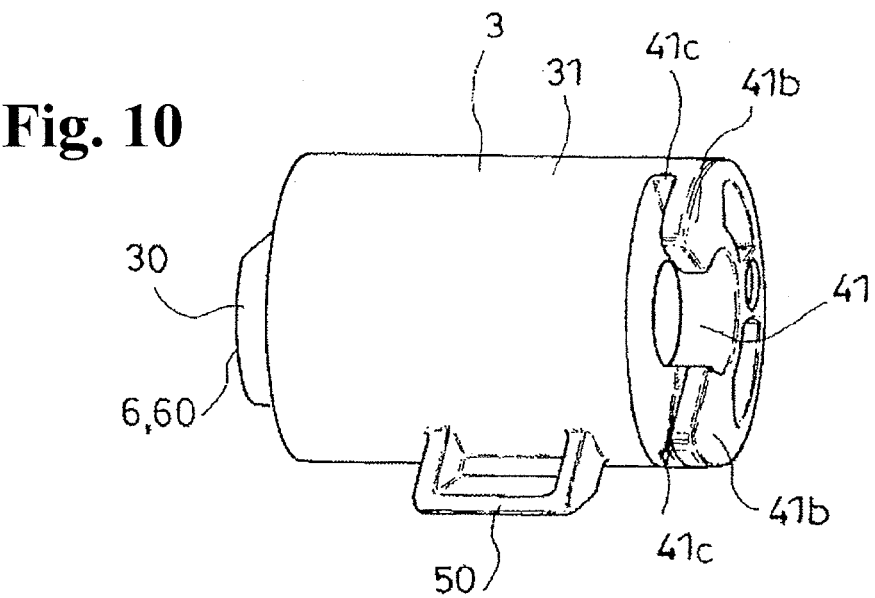
FIG. 10 is a perspective view of the rotation damper.
Figure 11:
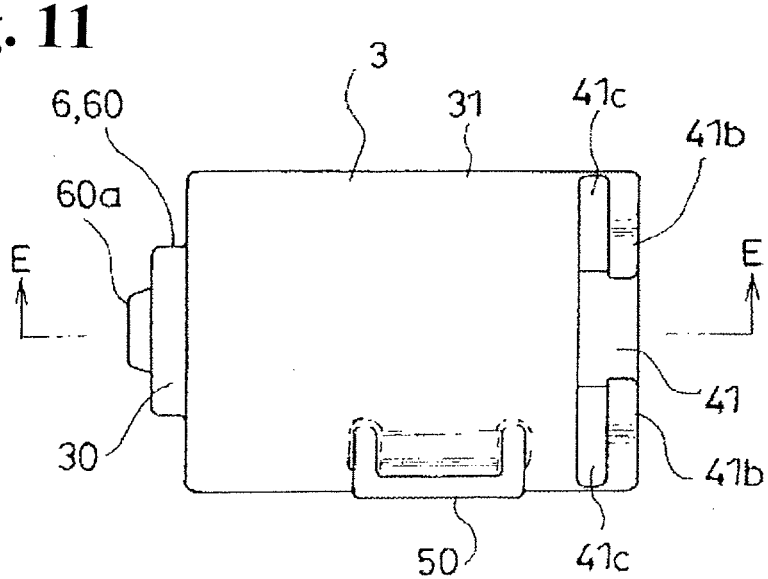
FIG. 11 is a front view of the rotation damper.
Figure 12:
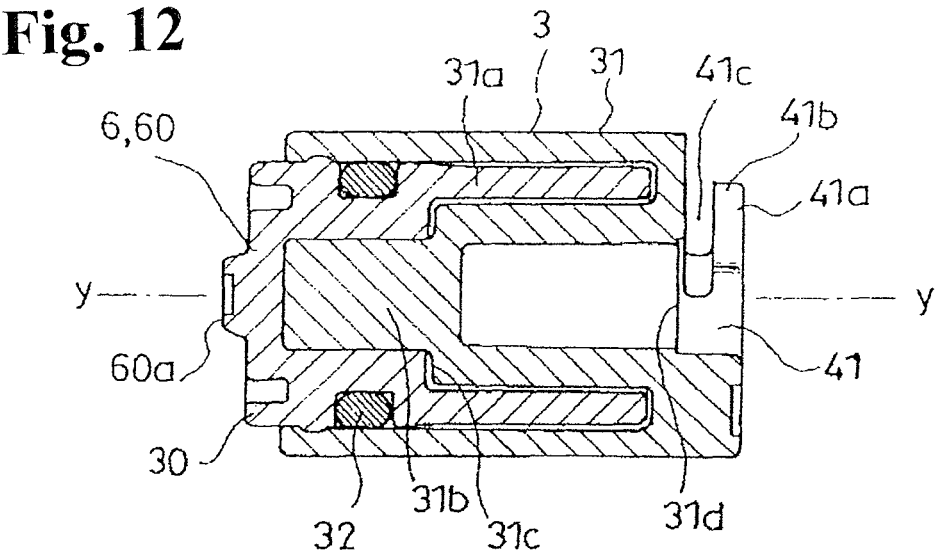
FIG. 12 is a cross-sectional structural view taken along the line E to E in FIG. 11.
Figure 13:
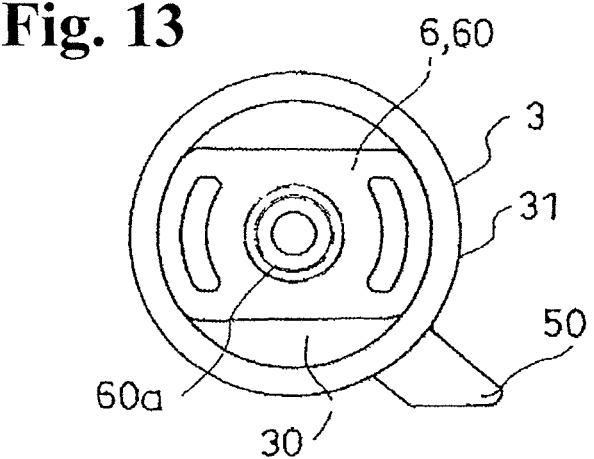
FIG. 13 is a left side view of the rotation damper.
Figure 14:
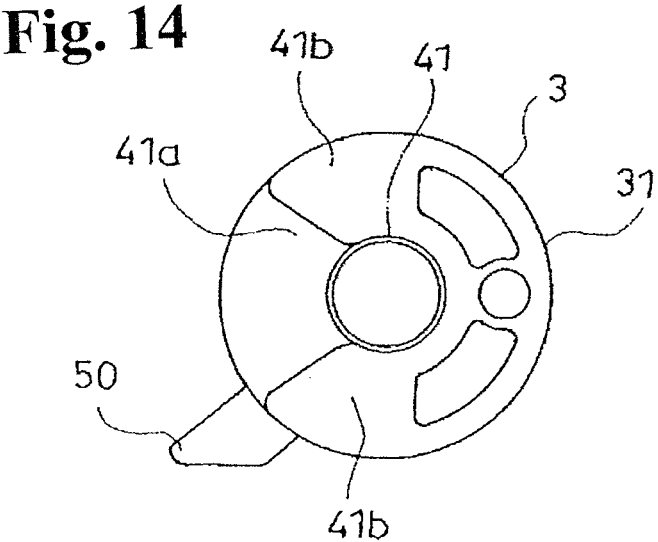
FIG. 14 is a right side view of the rotation damper.

Hereinafter, with reference to FIGS. 1 to 18, typical embodiments of the present invention will be explained. A braking structure for a turning body 2 according to the present embodiment is applied to a combined portion between this kind of turning body 2 and a base 1 so as to provide a predetermined braking force to the turning according to the turning body 2 combined turnably relative to the base 1.

In the present embodiment, there is shown an example wherein such braking structure is applied to an assist grip device as the turning body 2 provided in a vehicle interior of an automobile as an interior part of the automobile. Such braking structure allows the later-mentioned rotation damper 3 to be easily and adequately embedded on the combined portion between this kind of turning body 2 and the base 1, and such braking structure is especially suitable for being used when a braking force is provided to the interior part of the automobile and the like which strongly requires the easiness of such embedding. However, such braking structure can be used with respect to braking of each type of the turning body 2, and a usage thereof is not limited to the interior part of the automobile.

In the present embodiment, the base 1 is structured as an attachment member for attaching an assist grip 2 as the turning body 2 to a body side P of the automobile. In an illustrated example, by using two pieces of bases 1 and 1, the assist grip 2 is turnably attached to the vehicle interior of the automobile. The later-mentioned rotation damper 3 is embedded on only one of either such two pieces of the bases 1 and 1, and by the rotation damper 3, a predetermined braking force is provided to the turning of the assist grip 2. Such base 1 comprises a main body portion 10 and an embedding portion 11 of the rotation damper 3. From a back surface of the main body portion 10, there protrudes an insertion leg 10a, and the base 1 is adapted to be fixed to the body side P in a state wherein such insertion leg 10a is inserted into an attachment hole which is not shown in the drawings and is formed in the body side P of the automobile. In the illustrated example, the embedding portion 11 is formed in a lower side portion of the main body portion 10 so as to be integrated with the main body portion 10. Such embedding portion 11 is structured by a right-and-left pair of support wall portions 11a and 11a protruding toward a lower side from the lower side portion of the main body portion 10. The later-mentioned rotation damper 3 is adapted to be fitted between a pair of support wall portions 11a and 11a. Also, outside a pair of support wall portions 11a and 11a, there are respectively formed axis portions 11c combined with axis holes 1c formed in the later-mentioned arm portions 21 of the assist grip 2. In the illustrated example, one of such axis portions 11c is formed by a protrusion 11d integrally protruding along a turning center line x of the assist grip 2 from an outer surface portion of one of a pair of support wall portions 11a and 11a. Also, the other of such axis portions 11c is formed by a portion protruding to an outside of the other support wall portion 11a in a shaft 11e inserted through and fitted into a through-hole 11b formed on the other of a pair of support wall portions 11a or 11a along the turning center line x. Incidentally, in the illustrated example, on a front surface side of the base 1, a cover portion 12 covers between a pair of such support wall portions 11a and 11a. The cover portion 12 comprises arc-like inner and outer surfaces following an outer circumferential surface of the later-mentioned rotation damper 3 embedded on the embedding portion 11 from a back surface side. Also, in a position in an approximately middle in a right-and-left direction of such cover portion 12, there is formed a notch 12a, and a claw portion 50 of a movable-side portion 31 of the rotation damper 3 structuring the later-mentioned first fixing device 5 is fitted into a groove 51 of the arm portions 21 of the assist grip 2 through the notch 12a.

On the other hand, in the illustrated example, in the assist grip 2 as the turning body 2, respectively on both right-andleft ends of a grip portion 20 having a rod-like shape, there integrally comprises the arm portions 21 protruding in a direction perpendicular to a center axis of the grip portion 20. In the arm portions 21, there are respectively formed housing depressions 21*a* of the bases 1 depressed from a back surface side thereof. In portions which are the right-and-left wall portions 21*b* and 21*b* forming the housing depression 21*a*, and which are positioned on lower end sides of the arm portions 21, there are respectively formed axis holes 21*c* along the turning center line x of the assist grip 2. Then, in the illustrated example, after the axis portion 11*c* structured as the protrusion 11*d* in the base 1 is entered into the axis hole 21*c* formed in the wall portion 21*b* positioned on an external outline side of the assist grip 2 between the right-and-left wall portions 21*b* and 21*b* forming the housing depressions 21*a*, the shaft 11*e* is inserted and passed through the axis hole 21*c* formed in the wall portion 21*b* positioned on an internal outline side of the assist grip 2 through the through-hole 11*b* of the base 1. Accordingly, the base 1 is respectively attached to both right and left ends of the assist grip 2. Such assist grip 2 is mounted on the body side P of the automobile by two pieces of the bases 1 and 1 attached in the aforementioned manner turnably between a turned-down position wherein the grip portion 20 is positioned on an upper side (a position in FIG. 2) and a stand-up position wherein the arm portions 21 are positioned sideways. Typically, such assist grip 2 is operated to turn toward the stand-up position from the turned-down position against urging of a torsion coil spring 7 housed in the embedding portion 11 of the base 1 on a side in which the rotation damper 3 is not embedded between the right-and-left bases 1 and 1 so as to utilize the grip portion 20 by gripping in the stand-up position. When the gripping is released, due to such urging, the assist grip 2 is structured to be forcedly turned up to the turned-down position, and by the braking force of the later-mentioned rotation damper 3, the forced turning of such assist grip 2 is carried out slowly.

The braking structure according to the present embodiment comprises the rotation damper 3, an engagement device 4, the first fixing device 5, and a second fixing device 6.

The rotation damper 3 includes a stationary-side portion 30 and the movable-side portion 31, and is structured in such a way that a braking force acts on a rotation of the movable-side portion 31. In the present embodiment, such rotation damper 3 is embedded on the embedding portion 11 in such a way that a rotation center line y of the movable-side portion 31 thereof is approximately conformed to the turning center line x of the assist grip 2.

The movable-side portion 31 of such rotation damper 3 comprises an outside cylindrical portion 31*a* and an inside axis-like portion 31*b*. The outside cylindrical portion 31*a* closes one end of a cylinder, and opens the other end of the cylinder. The inside axis-like portion 31*b* integrally connects an axis base portion to an inner surface portion of one closed end of the cylinder of the outside cylindrical portion 31*a*, and extends to the other end side of the cylinder along a cylinder axis of the outside cylindrical portion 31*a*. Also, the inside axis-like portion 31*b* positions an end of an axis in the approximately same position as one end of the cylinder of the outside cylindrical portion 31*a*. In the illustrated example, the inside axis-like portion 31*b* of such movable-side portion 31 has a thick diameter between the axis base portion thereof and an approximately middle position in a length direction, and has a diameter between the approximately middle position and the end of the axis that is thinner than the aforementioned thick diameter. The inside axis-like portion 31*b* of such movable-side portion 31 comprises a circular step surface 31*c*, facing the other end side of the cylinder of the outside cylindrical portion 31*a*, in such approximately middle position. Also, the portion having the thick diameter of the inside axis-like portion 31*b* is hollow, and an opening 31*d* communicated with an inside of the portion having the thick diameter is formed in a formation end portion (a right side in FIG. 12) of the engagement device 4 of the rotation damper 3. Also, in an outer surface portion of the outside cylindrical portion 31*a* of such movable-side portion 31, there is formed the claw portion 50 structuring the first fixing device 5 forming a long protrusion shape in a rotation center line y direction of the movable-side portion 31.

Also, the stationary-side portion 30 of such rotation damper 3 is structured in such a way as to form a cylinder shape whose one end of the cylinder is closed and whose the other end of the cylinder is open. An external diameter of such stationary-side portion 30 is approximately equal to an internal diameter of the outside cylindrical portion 31*a* of the movable-side portion 31, and also the inside axis-like portion 31*b* of the movable-side portion 31 is adapted to be housed inside such stationary-side portion 30 with a small gap. In the illustrated example, an internal shape of the stationary-side portion 30 has a complementary shape relative to the inside axis-like portion 31*b* of the movable-side portion 31. Then, in the illustrated example, in the stationary-side portion 30 of such rotation damper 3, in a state wherein one end side of the cylinder thereof is slightly protruded to an outside from the other end of the cylinder of the outside cylindrical portion 31*a* of the movable-side portion 31, the rest of the portion is housed between the outside cylindrical portion 31*a* and the inside axis-like portion 31*b* of the movable-side portion 31. The movable-side portion 31 rotates or relatively rotates in such a way as to be received by an axis of the stationary-side portion 30 which is combined in the aforementioned manner. In an outer surface portion of one closed end of the cylinder of the stationary-side portion 30, there is formed a projecting piece portion 60 structuring the second fixing device 6.

In the illustrated example, a viscous fluid such as a silicon oil and the like which is not shown in the drawings is encapsulated inside the movable-side portion 31, so that the braking force acts on a rotation of a movable-side member. In the drawings, the reference numeral 32 represents a seal ring fitted into an outside of a fixed-side member in order to block leakage of such viscous fluid between an outer circumferential portion of one end side of the cylinder of the stationary-side portion 30 and an inner circumferential portion of the outside cylindrical portion 31*a* of the movable-side portion 31.

The first fixing device 5 fixes the movable-side portion 31 of the rotation damper 3 relative to the turning body 2. In the illustrated example, such first fixing device 5 is structured by the claw portion 50 formed in the movable-side portion 31 of the rotation damper 3, and the groove 51 of the arm portions 21 of the assist grip 2. Such groove 51 is formed inside the housing depressions 21*a* of the assist grip 2. Then, in the illustrated example, in a state wherein the assist grip 2 is in the turned-down position, when the rotation damper 3 is fully embedded on one housing depression 21*a* of the two pieces of bases 1 and 1 using the second fixing device 6 and the engagement device 4, such claw portion 50 fits into the groove 51, so that the assist grip 2 and the movable-side portion 31 of the rotation damper 3 are adapted to be integrated. (FIG. 2) Since the stationary-side portion 30 of the rotation damper 3 is fixed to a base 1 side by the second fixing device 6, when the assist grip 2 is turned, accompanied by that, only the movable-side portion 31 of the rotation damper 3 turns, and due to a resistance of the viscous fluid, a braking force based on the resistance acts on the aforementioned turning.

The second fixing device 6 fixes the stationary-side portion 30 of the rotation damper 3 relative to the base 1. In the illustrated example, such second fixing device 6 is structured by the projecting piece portion 60 formed in the stationary-side portion 31 of the rotation damper 3, and a groove 61 formed in an inner surface portion of one of a pair of support wall portions 11a or 11a structuring the embedding portion 11 of the base 1. Such projecting piece portion 60 is formed in the outer surface portion of one end of the cylinder of the stationary-side portion 30 in such a way as to range in a diametrical direction of the stationary-side portion 30 by passing through a center position thereof. A width of the projecting piece portion 60 approximately conforms to a width of the groove portion 61. The groove portion 61 opens a groove opening on a back surface side, and continues to a front surface side. Also, an entire length of the rotation damper 3 is approximately conformed to a distance between a pair of support wall portions 11a and 11a structuring the embedding portion 11 of the base 1. Thereby, from a state wherein one end of the projecting piece portion 60 is matched to the groove opening of such groove portion 61, when the rotation damper 3 is pushed into the embedding portion 11 toward the front surface side from the back surface side, the projecting piece portion 60 fits into the groove portion 61, so that the stationary-side portion 30 of the rotation damper 3 is adapted to be fixed to the base 1 side. Incidentally, in the illustrated example, in a position which becomes a rotation center of the movable-side portion 31 of the rotation damper 3 in the projecting piece portion 60, there is formed a circular protrusion 60a, and also inside the groove portion 61, there are formed a circular depression 61a in which the protrusion 60a can be housed, and a guide groove 61b guiding the protrusion to the depression 61a.

The engagement device 4 rotatably engages the movable-side portion 31 of the rotation damper 3 with the base 1 in the rotation center thereof. In the illustrated example, one engagement device 4 is an axis protrusion 40. In the example shown in FIGS. 1 to 14, the example shown in FIG. 15, the example shown in FIG. 16, and the example shown in FIGS. 17(a) and 17(b), such axis protrusion 40 is formed by a portion protruding to an inside of the other support wall portion 11a in the shaft 11e fitted by being inserted and passed through the through-hole 11b formed on the other of a pair of support wall portions 11a or 11a structuring the embedding portion 11 of the base 1. Also, in the example shown in FIGS. 1 to 14, the example shown in FIG. 15, the example shown in FIG. 16, and the example shown in FIGS. 17(a) and 17(b), the other of such engagement device 4 is a receiving portion 41 receiving the axis protrusion 40 accompanied by the embedding of the rotation damper 3 on the embedding portion 11 of the base 1. In the illustrated example, such receiving portion 41 is formed in the movable-side portion 31 of the rotation damper 3. On the other hand, in the example shown in FIG. 18, the axis protrusion 40 is formed in the movable-side portion 31, and the receiving portion 41 receiving the axis protrusion 40 is formed on the base 1 side.

Figure 15:
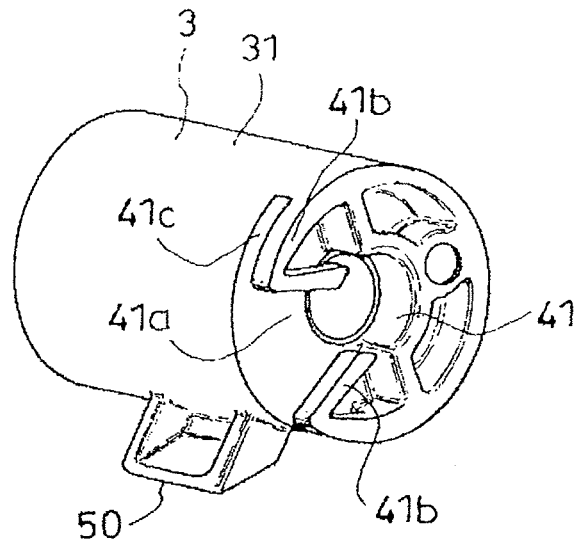
FIG. 15 is a perspective structural view of the rotation damper according to a first modified example of a structure of an engagement device.

In the example shown in FIGS. 1 to 14, such receiving portion 41 receives the axis protrusion 40 from a direction perpendicular to a center axis (the rotation center line y) of the movable-side portion 31 accompanied by the embedding of the rotation damper 3 on the embedding portion 11 of the base 1. Also, an inserting path 41a for the axis protrusion 40 continuing to the receiving portion 41 is structured to expand by an elastic deformation in the direction perpendicular to the rotation axis when the inserting path 41a receives the axis protrusion 40. Specifically, such inserting path 41a is formed between a pair of elastic engaging pieces 41b and 41b. In the example, an end portion opposite to a formation end portion of the second fixing device 6 in the rotation damper 3 is a formation end portion of the engagement device 4. Specifically, the formation end portion of the engagement device 4 is one end portion of the movable-side portion 31. In the example, in one end portion of the movable-side portion 31, there is formed the receiving portion 41 forming a hole shape having a size approximately equal to an external diameter of the axis protrusion 40 in the rotation center of the movable-side portion 31. The inserting path 41a forming a groove shape is formed between the receiving portion 41 and an outer circumferential surface of the movable-side portion 31. The inserting path 41a is formed in such a way as to gradually narrow a width as the inserting path 41a approaches the receiving portion 41, and a width of the inserting path 41a at a portion communicated with the receiving portion 41 is slightly narrower than a diameter of the axis protrusion 40. Also, structural portions of the movable-side portion 31 positioned on both sides clamping such inserting path 41a respectively function as the elastic engaging pieces 41b by notches 41c formed toward a center side from the outer circumferential surface of the movable-side portion 31 in the direction perpendicular to the rotation axis of the movable-side portion 31. When the rotation damper 3 is embedded on the embedding portion 11 of the base 1, the axis protrusion 40 reaches the receiving portion 41 while elastically deforming the inserting path 41a, and due to an elastic return at a position thereof, the axis protrusion 40 is stably held in the receiving portion 41. Thereby, the movable-side portion 31 of the rotation damper 3 can be rotatably combined smoothly relative to the base 1, and can be supported. Incidentally, FIG. 15 shows a modified example with a shape of the elastic engaging pieces 41b structuring the inserting path 41a.

Figure 16:
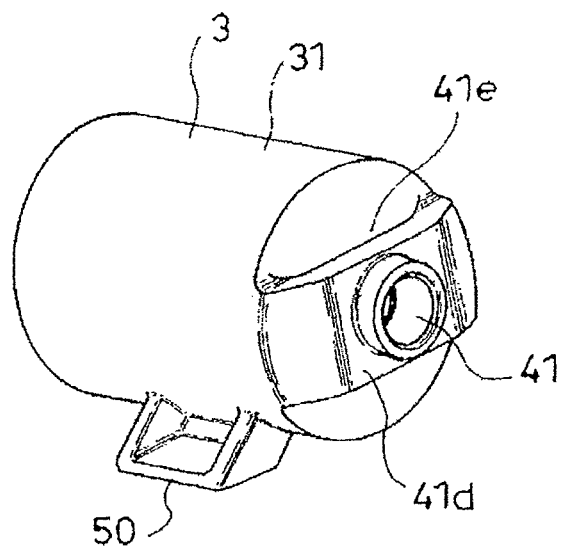
FIG. 16 is a perspective structural view of the rotation damper according to a second modified example of the structure of the engagement device.
Figure 17:
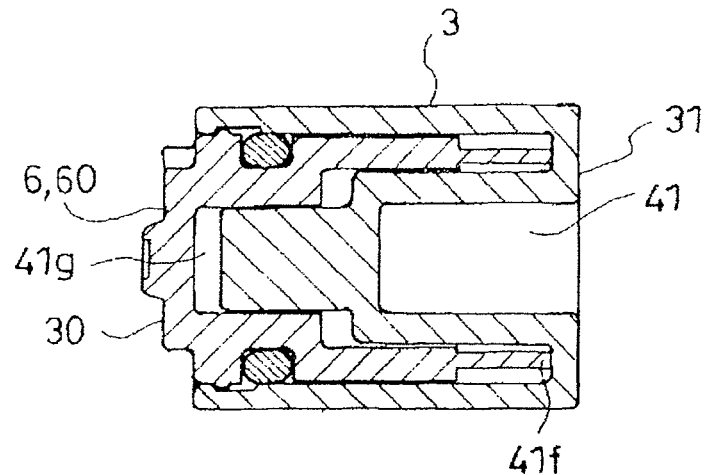
FIGS. 17(a) and 17(b) are cross-sectional structural views of the rotation damper according to a third modified example of the structure of the engagement device.
Figure 17:
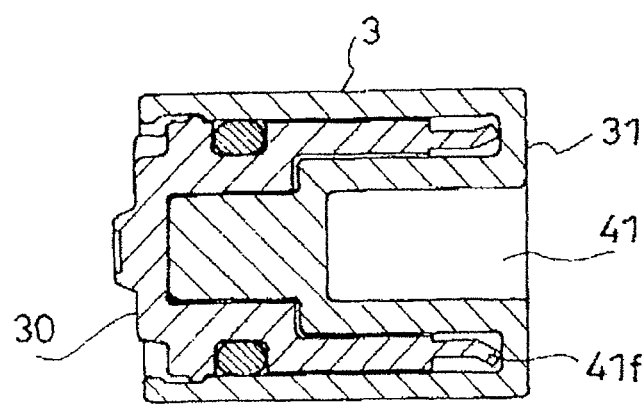

In the example shown in FIG. 16, the receiving portion 41 is structured in such a way as to receive the axis protrusion 40 from a direction along the rotation axis of the movable-side portion 31 accompanied by the embedding of the rotation damper 3 on the embedding portion 11 of the base 1. At the same time, a formation side of the receiving portion 41 moves in the direction along the rotation axis by an elastic deformation when such receiving portion 41 receives the axis protrusion 40. In the example, in one end portion of the movable-side portion 31, the receiving portion 41 is structured as a hole formed in the rotation center of the movable-side portion 31 and having a size approximately equal to the external diameter of the axis protrusion 40. Also, in the example, in such receiving portion 41, both ends of one side are integrally connected to an outer circumferential marginal portion of one end portion of the movable-side portion 31 respectively. Also, such receiving portion 41 is formed in a center portion of one side of a bridging piece 41d provided outside one end portion in such a way as to form a deformation gap 41e between the center portion of one side and one end portion of the movable-side portion 31. (FIG. 16) When the rotation damper 3 is embedded on the embedding portion 11 of the base 1, the axis protrusion 40 makes a contact with the bridging piece 41d; elastically deforms the bridging piece 41d; and reduces the aforementioned gap 41e so as to reach the receiving portion 41. When the axis protrusion 40 reaches the receiving portion 41, the elastic return of the bridging piece 41d is allowed, and the gap 41e expands to a desired size, so that the axis protrusion 40 is stably held in the receiving portion 41. Thereby, the movable-side portion 31 of the rotation damper 3 can be rotatably combined smoothly relative to the base 1, and can be supported.

In the example shown in FIGS. 17(a) and 17(b), the receiving portion 41 is structured to receive the axis protrusion 40 from the direction along the rotation axis of the movable-side portion 31 accompanied by the embedding of the rotation damper 3 on the embedding portion 11 of the base 1. At the same time, the formation side of the receiving portion 41 moves in the direction along the rotation axis by the elastic deformation when such receiving portion 41 receives the axis protrusion 40. In the example, in one end portion of the movable-side portion 31, the receiving portion 41 is structured as the hole formed in the rotation center of the movable-side portion 31 and having the size approximately equal to the external diameter of the axis protrusion 40. Also, in the example, the other opened end 41f of the cylinder in the stationary-side portion 30 is structured to be elastically deformable, and also in a state wherein the other end 41f of the cylinder is not allowed to be elastically deformed, a gap 41g is adapted to be formed between an inner surface portion of one closed end of the cylinder of the stationary-side portion 30 and an axis end of the inside axis-like portion 31b of the movable-side portion 31. (FIG. 17(a)) When the rotation damper 3 is embedded on the embedding portion 11 of the base 1, the axis protrusion 40 makes a contact with one end portion of the movable-side portion 31; elastically deforms the other opened end 41f of the cylinder of the stationary-side portion 30; and reduces the aforementioned gap 41g so as to reach the receiving portion 41. (FIG. 17(b)) When the axis protrusion 40 reaches the receiving portion 41, the elastic return of the other opened end 41f of the cylinder of the stationary-side portion 30 is allowed, and the gap 41g expands to the desired size, so that the axis protrusion 40 is stably held in the receiving portion 41. Thereby, the movable-side portion 31 of the rotation damper 3 can be rotatably combined smoothly relative to the base 1, and can be supported.

Figure 18:
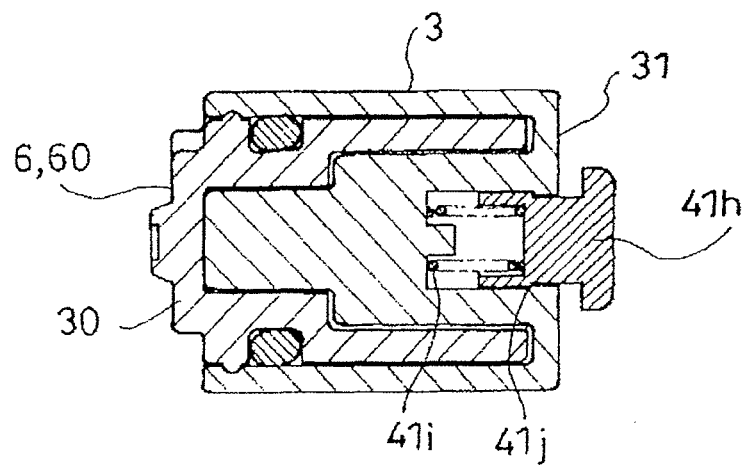
FIG. 18 is a cross-sectional structural view of the rotation damper according to a fourth modified example of the structure of the engagement device.

In the example shown in FIG. 18, a receiving portion corresponding to the receiving portion 41 and not shown in the drawings is structured to receive an axis protrusion corresponding to the axis protrusion 40 from the direction along the rotation axis of the movable-side portion 31 accompanied by the embedding of the rotation damper 3 on the embedding portion of the base 1. Also, a side of the axis protrusion is adapted to move in the direction along the rotation axis against urging of an urging device when such receiving portion receives the axis protrusion. In the example, such axis protrusion is structured by an axis-protrusion structural body 41h housing one portion in a hollow portion formed in the inside axis-like portion 31b of the movable-side portion 31 and protruding outwardly from the opening. Inside such hollow portion, there is housed a coil spring 41i as the urging device, and by the spring 41i, a distance between a protruding end of the axis-protrusion structural body 41h and the formation end portion of the second fixing device 6 of the rotation damper 3 is made slightly larger than the distance between a pair of support wall portions 11a and 11a structuring the embedding portion 11. The reference numeral 41j in the drawing represents a control portion controlling a protruding amount of the axis-protrusion structural body 41h. When the rotation damper 3 is embedded on the embedding portion 11 of the base 1, the axis-protrusion structural body 41h makes a contact with an inner surface portion of a support wall, and retracts while elastically deforming the spring 41i so as to reach the receiving portion which is not shown in the drawing. When the axis-protrusion structural body 41h reaches the receiving portion which is not shown in the drawing, the elastic return of the spring 41i is allowed, and the axis-protrusion structural body 41h proceeds so as to be stably held in the receiving portion which is not shown in the drawing. Thereby, the movable-side portion 31 of the rotation damper 3 can be rotatably combined smoothly relative to the base 1, and can be supported.

Also, in each braking structure explained above, since the movable-side portion 31 of the rotation damper 3 and the base 1 only make a contact with each other with an elastic force such as the elastic engaging pieces 41b and the like in a connecting portion thereof, an excessive clamping force and the like never act on the rotation damper 3 embedded on the embedding portion 11 of the base 1 by a pair of support wall portions 11a and 11a, so that the rotation damper 3 can be functioned adequately with a desired movement.

Incidentally, all contents of the specification, claims, drawings, and abstract of Japanese Patent Application No. 2009-263188 filed on Nov. 18, 2009 are cited in their entireties herein and are incorporated as a disclosure of the specification of the present invention.

What is claimed is:

1. A braking structure for a turning body turnably combined relative to a base, comprising:
   a rotation damper including a stationary-side portion and a movable-side portion, and structured to act a braking force on a rotation of the movable-side portion;
   an engagement device arranged at one end portion of the movable-side portion and adapted to be rotatable with the base at a rotation center thereof;
   a first fixing device adapted to fix the movable-side portion relative to the turning body; and
   a second fixing device adapted to fix the stationary-side portion of the rotation damper relative to the base,
   wherein the engagement device includes an axis protrusion adapted to be provided on the base, a receiving portion provided on the rotation center of the movable-side portion and including a hole portion having an inner diameter substantially equal to an external diameter of the axis protrusion, the receiving portion receiving the axis protrusion from a direction perpendicular to a rotation axis of the rotation, a pair of elastic engaging pieces surrounding the receiving portion, and an inserting path formed between the pair of elastic engaging pieces, and
   the inserting path guides the axis protrusion to the receiving portion and is expandable in the direction perpendicular to the rotation axis by an elastic deformation of the pair of elastic engaging pieces when the receiving portion receives the axis protrusion.

2. A braking structure for a turning body according to claim 1, wherein the inserting path is a groove extending inwardly from an outer circumferential surface of the movable-side portion to the receiving portion, and the inserting path has a diameter narrower than that of the axis protrusion at a portion communicated with the receiving portion.

3. A braking structure for a turning body according to claim 2, wherein the movable-side portion has an end portion, and each of the pair of elastic engaging pieces protrudes circumferentially from the end portion to surround the receiving portion.

4. A braking structure for a turning body according to claim 3, wherein the end portion of the movable-side portion includes notches communicating circumferentially with the inserting path and located adjacent to the pair of elastic engaging pieces, respectively, so that each of the pair of elastic engaging pieces is spaced from the inserting path in a direction of the rotation axis.

5. A braking structure for a turning body according to claim 4, wherein the diameter of the inserting path becomes gradually narrow in a direction from the outer circumferential surface of the movable-side portion toward the receiving portion.

6. A braking structure for a turning body according to claim 5, wherein each of the pair of elastic engaging pieces includes a hook portion forming a space inside thereof, and the inserting path is formed between the hook portions.

* * * * *